United States Patent [19]

Crosby

[11] Patent Number: 4,545,796
[45] Date of Patent: Oct. 8, 1985

[54] SPINNER DEVICE FOR ROTARY PRODUCTION OF FIBERS

[75] Inventor: E. Eugene Crosby, Reynoldsburg, Ohio

[73] Assignee: Owens-Corning Fiberglas Corporation, Toledo, Ohio

[21] Appl. No.: 581,924

[22] Filed: Feb. 21, 1984

[51] Int. Cl.⁴ .............................................. C03B 37/05
[52] U.S. Cl. ............................................ 65/15; 65/14; 403/256; 403/260
[58] Field of Search ........................... 65/6, 8, 14, 15; 403/261, 260, 256

[56] References Cited

U.S. PATENT DOCUMENTS

| 420,543 | 2/1890 | Peckham | 403/256 X |
|---|---|---|---|
| 3,238,029 | 3/1966 | Cullen | 65/15 |
| 3,352,343 | 11/1967 | Stitt | 403/256 X |
| 3,372,014 | 3/1968 | Garrison | 65/15 |
| 4,276,783 | 7/1981 | Anderson | 403/260 X |
| 4,411,549 | 10/1983 | Sheppard | 403/260 X |

Primary Examiner—Robert Lindsay
Attorney, Agent, or Firm—Ronald C. Hudgens; Ted C. Gillespie

[57] ABSTRACT

Apparatus for the rotary production of fibers comprising a flanged rotatable shaft with the spinner positioned on the flange and retained substantially in fixed relationship to the shaft by means of bearing means slideably positionable along the shaft.

10 Claims, 3 Drawing Figures

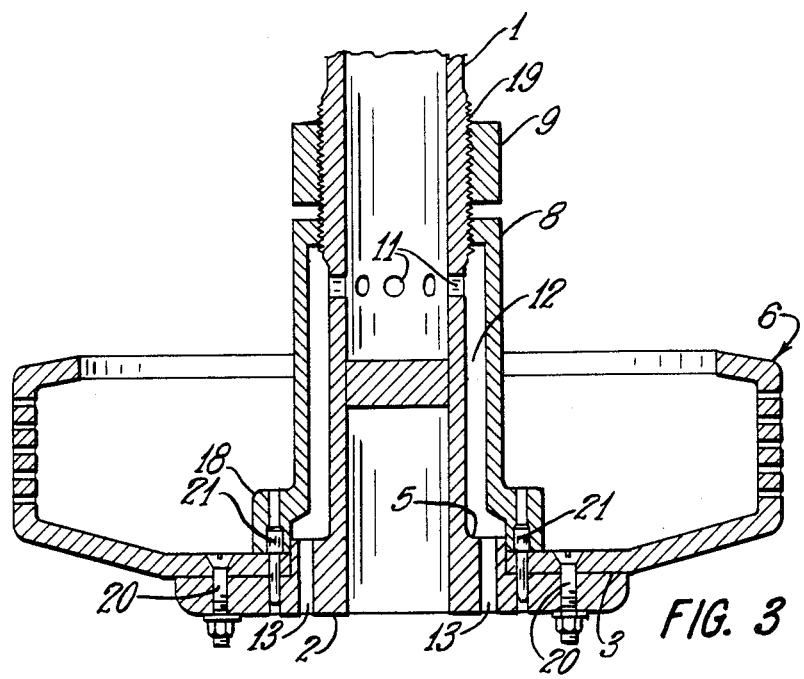

SPINNER DEVICE FOR ROTARY PRODUCTION OF FIBERS

TECHNICAL FIELD

This invention pertains to spinner devices for the rotary production of fibers.

In one of its more specific aspects, this invention pertains to spinners and their attachment to the driving mechanism used in the production of glass fibers.

In the production of glass fibers, it is commercial practice to introduce molten glass into an apertured wall chamber. The chamber is rotated at high speeds and the molten glass is projected through the apertures in the form of fibers which are collected and used as insulation and the like.

Because of the high speeds at which spinners are rotated, they must be securely fixed to the driving, rotating shaft, or quill. Additionally, the spinners are subjected to high operating temperatures. This combination of operating conditions necessitates the frequent removal of the spinner from the quill and attendant replacement. However, due to the high temperatures at which the spinner has operated, fastening methods, such as bolting of the spinner to the quill, makes spinner detachment from the quill difficult.

This invention is directed to the solution of that problem.

STATEMENT OF THE INVENTION

According to this invention, there is provided apparatus for the rotary production of fibers which comprises a rotatable shaft having at least one flange at its terminus, a spinner removably positioned on the flange and bearing means encompassing the shaft and bearing on the internal surface of the spinner to maintain the spinner in contact relationship with the flange.

In one embodiment of the invention a passageway opens through the rotatable shaft and into a space between the bearing means and the shaft and exits therefrom through a passageway opening through one of the shoulders of the flange.

BRIEF DESCRIPTION OF THE DRAWINGS

FIG. 3 is a view in elevation of another embodiment of the invention.

BRIEF DESCRIPTION OF THE INVENTION

Figure 1:
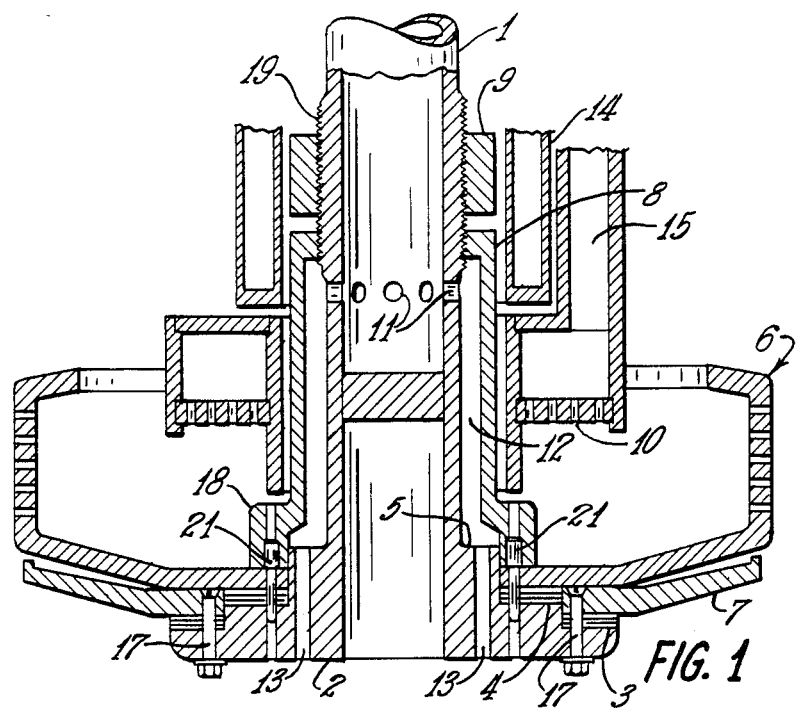
FIG. 1 is a view in elevation of one embodiment of the invention.

Referring now to the FIG. 1, there is shown a mechanism for the rotary production of fibers comprising rotatable shaft, or quill, 1 having spinner 6 afixed to the terminus 2 thereof. The quill can be adapted at its terminus with at least one, and preferably with a plurality of shoulders of the flange including lower shoulder 3, middle shoulder 4 and upper shoulder 5.

Positioned on the lower shoulder can be heat shield 7 which can be maintained fixedly thereto by suitable fastening means, such as bolts 17.

Fitted in circumferential relationship to the shaft is bearing member 8. This member has its lower portion 18 positioned in contact with the inner surface of the spinner and by means of compression member, or lock member 9, the spinner is held in substantially a fixed position preventing either a vertical, horizontal or rotational movement of the spinner.

The bearing member can be of any suitable size and shape. Preferably, it will have a cylindrical upper portion and a cylindrical lower portion, the walls of both portions being continuous around their peripheries. However, the member can take the form of a truncated cone which tapers inwardly at its upper portion which provides a snug fit around the shaft. The bearing member will, at its lower portion, form a passageway 12 between the inner periphery of the bearing member and the outer periphery of the quill for the passage of a suitable coolant therethrough. This coolant will enter the passageway through opening 11 formed through the wall of the shaft and can exit from the passageway between the bearing means and the shaft through a passageway 13 which can open through one of the shoulders.

Positioned in slideable relationship to the shaft will be compression member 9. This compression member is adapted to bear down on the uppermost portion of the bearing member to place it in compression and, in doing so, to retain the spinner in substantially fixed relationship to the shaft.

Any suitable type of compression member can be employed. For example, the shaft can be adapted with a threaded portion 19 positioned at the upper extremity of the bearing member when positioned in contact with the spinner. A lock nut can then be screwed on the bearing member such that when engaged with the threaded portion of the shaft and turned in a downward direction, the bearing member is placed in compression to hold the spinner in a substantially fixed position.

Suitable arrangements also include a two-part collar positioned in a groove formed in the shaft, a locking ring, a spanner nut, and the like.

Advantageously, there can be positioned proximate the compression member any suitable arrangement of a cooling jacket 14 having an inlet and outlet not shown, to cool the upper portion of the shaft and compression member to facilitate loosening when desired.

The apparatus can also be adapted in the usual manner with burner 10 having fuel inlet 15 for providing heating for the attenuation process.

The apparatus can also be adapted with any suitable number of positioning pins 21 which aid in properly locating the spinner in relation to the shaft and also aid in preventing the rotation of the spinner around the vertical axis of the shaft.

Figure 2:
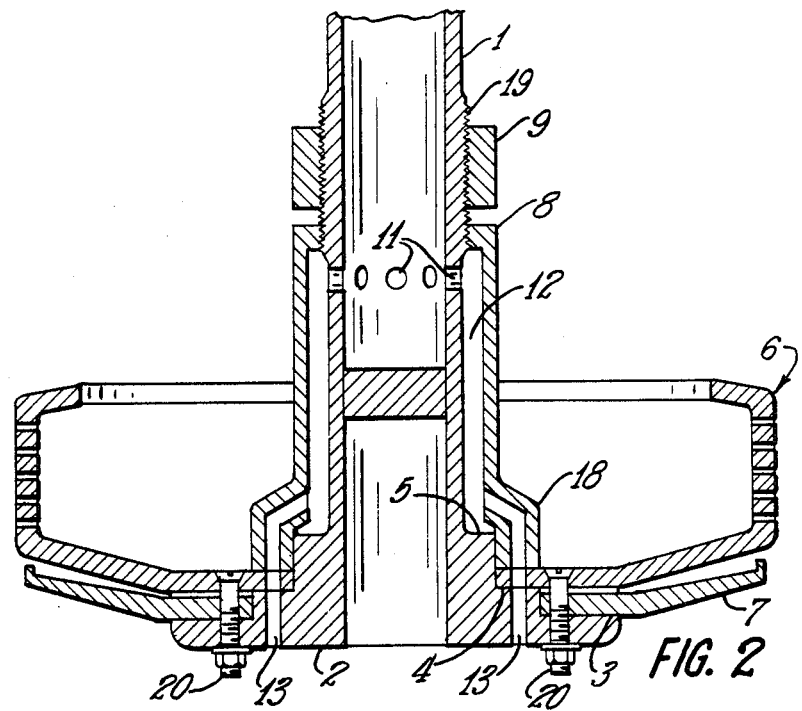
FIG. 2 is a view in elevation of a second embodiment of the invention.

With reference to FIG. 2, in which like numerals designate like parts in respect to FIG. 1, fastening mechanisms such as bolts 20 can be employed to afix the spinner to the lower end portion of the quill. In this embodiment, while positioning pins can be employed, the coolant outlet path 13 can be angled outwardly away from the quill to bring the coolant passing through passageway 12 and air exit 13 close to the bolts to cool the bolts and minimize their seizure.

With reference to FIG. 3, in which like numerals designate like parts in respect to FIG. 1 and 2, there is shown a rotatable shaft adapted with a flange, having a single shoulder on which the spinner is positioned, either bolts or pins, or both, being employed conjunctively.

It will be evident from the foregoing that various modifications can be made to the apparatus of this invention. Such, however, are considered as being within the scope of the invention.

I claim:

1. Apparatus for the rotary production of fibers from molten glass which comprises:
   (a) a rotatable drive shaft having at least one flange proximate one terminus;
   (b) a spinner positioned circumferentially to said shaft and in contact with one of said flanges; and,
   (c) bearing means slideably positioned on said shaft and in bearing relationship to said spinner to compress said spinner against said flange to cause said spinner to rotate in unison with said rotatable drive shaft, said bearing relationship being effected without having said bearing means pass through the bottom wall of said spinner.

2. The apparatus of claim 1 in which said flange comprises a plurality of shoulders.

3. The apparatus of claim 1 in which said bearing means is positioned in spaced relationship to said shaft to form a chamber therebetween.

4. The apparatus of claim 3 in which a port opens through said shaft into said chamber.

5. The apparatus of claim 4 in which a port opens from said chamber through said flange at a locus between said shaft and a bolt positioned in said flange.

6. The apparatus of claim 1 in which said spinner is positioned on a heat shield.

7. The apparatus of claim 1 in which a cooling jacket is positioned proximate said bearing means.

8. The apparatus of claim 1 in which positioning pins penetrate said flange and said spinner.

9. The apparatus of claim 1 in which said flange comprises a plurality of shoulders and a positioning pin is located through one of said shoulders and a port opening from a chamber positioned between said shaft and said bearing means opens through a second of said shoulders.

10. The apparatus of claim 9 in which said flange comprises three shoulders and a bolt is positioned in the shoulder outermost from the shaft, a positioning pin is positioned in the centrally positioned shoulder and a port opening from a chamber positioned between said shaft and said bearing means opens through the innermost of said shoulders.

* * * * *